O. SMITH.
CLUTCH AND ACTUATING MEANS THEREFOR.
APPLICATION FILED DEC. 14, 1911.
1,198,075.
Patented Sept. 12, 1916.
4 SHEETS—SHEET 1.
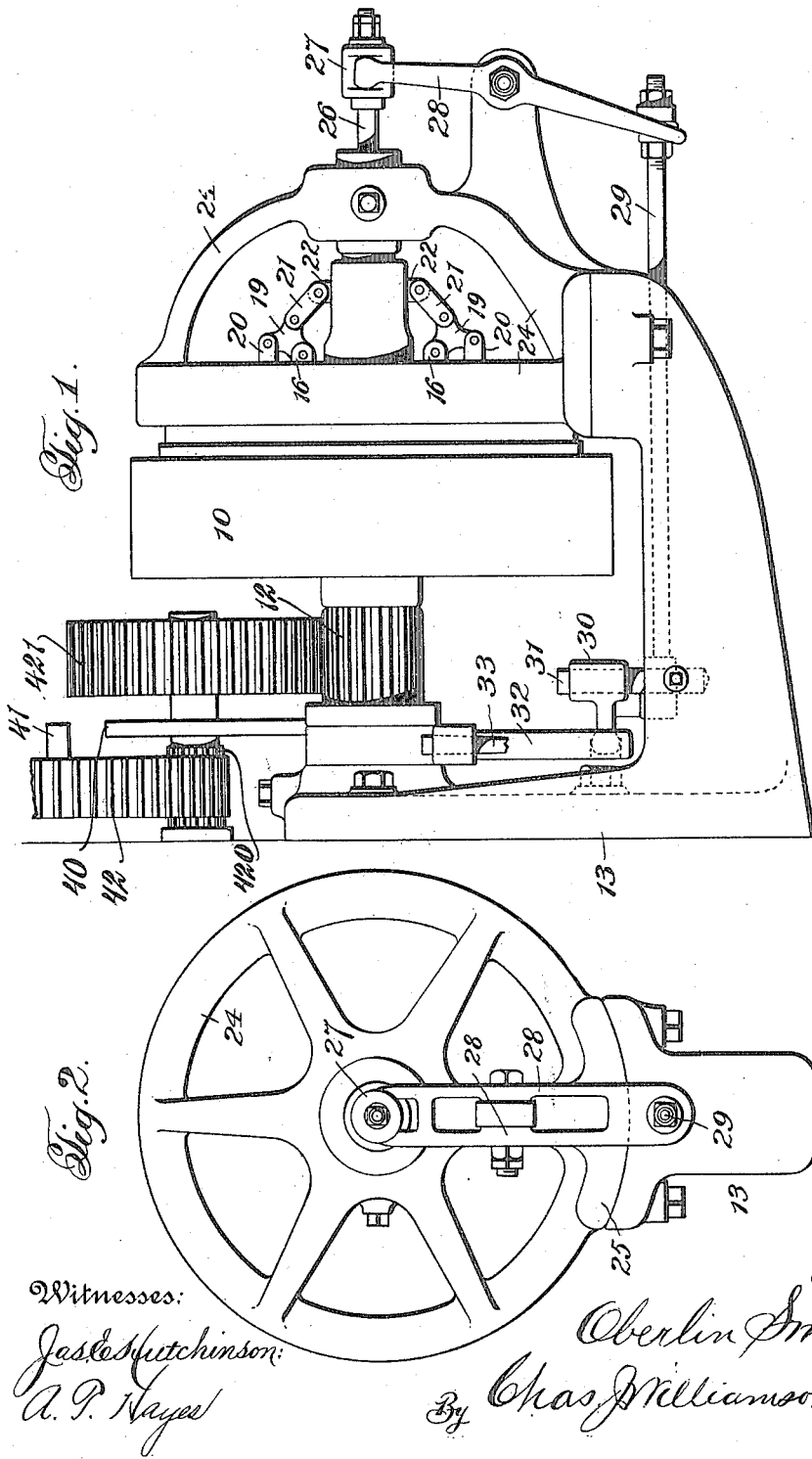

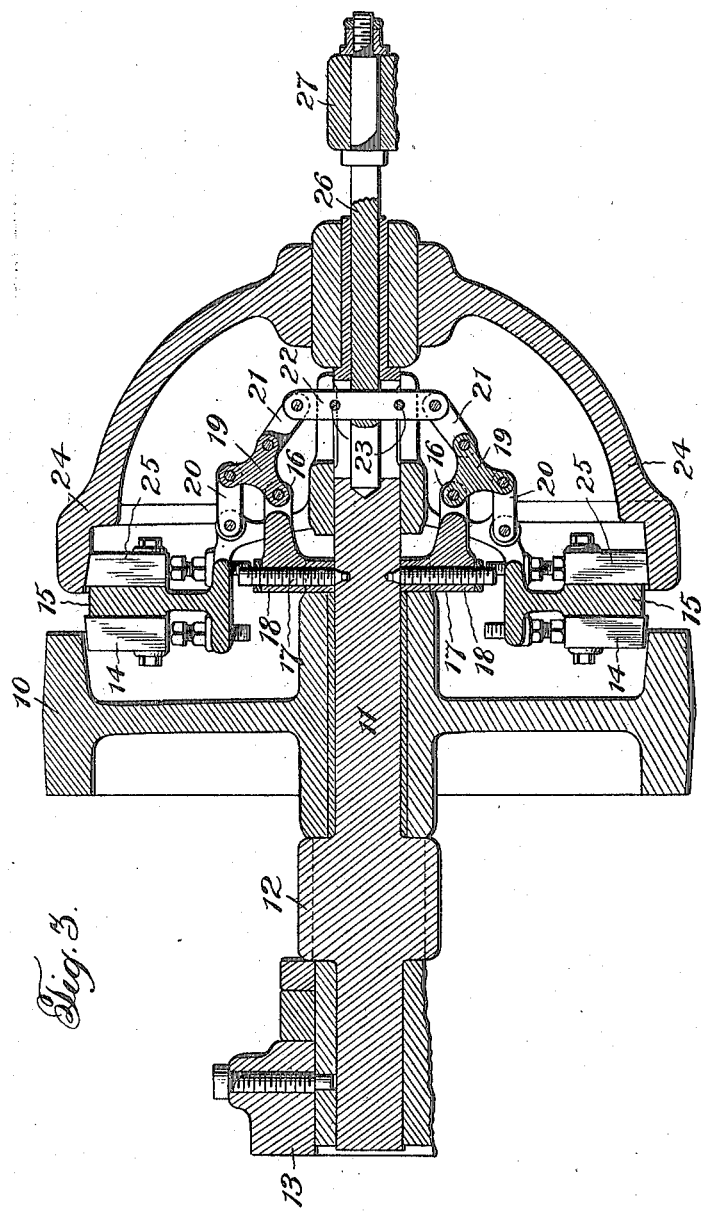

O. SMITH.
CLUTCH AND ACTUATING MEANS THEREFOR.
APPLICATION FILED DEC. 14, 1911.
1,198,075.
Patented Sept. 12, 1916.
4 SHEETS—SHEET 3.
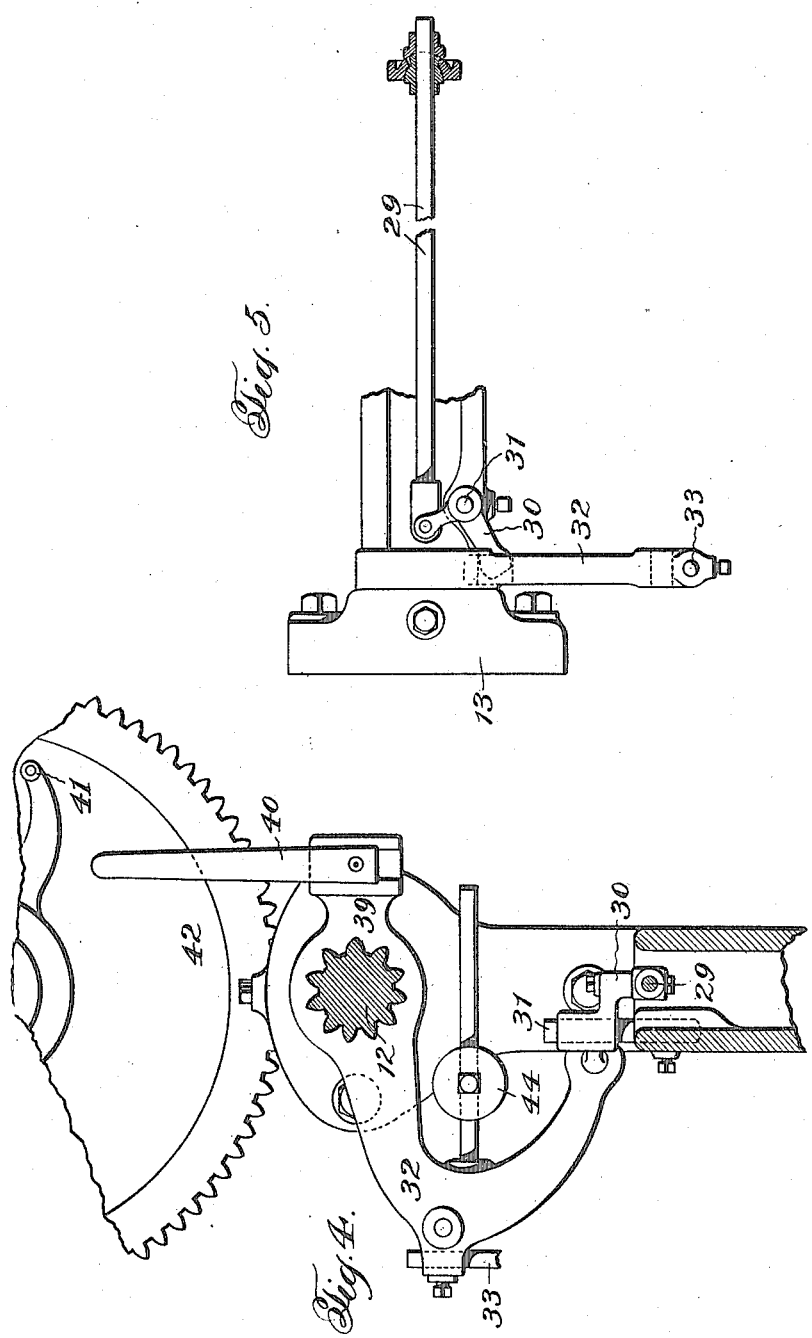

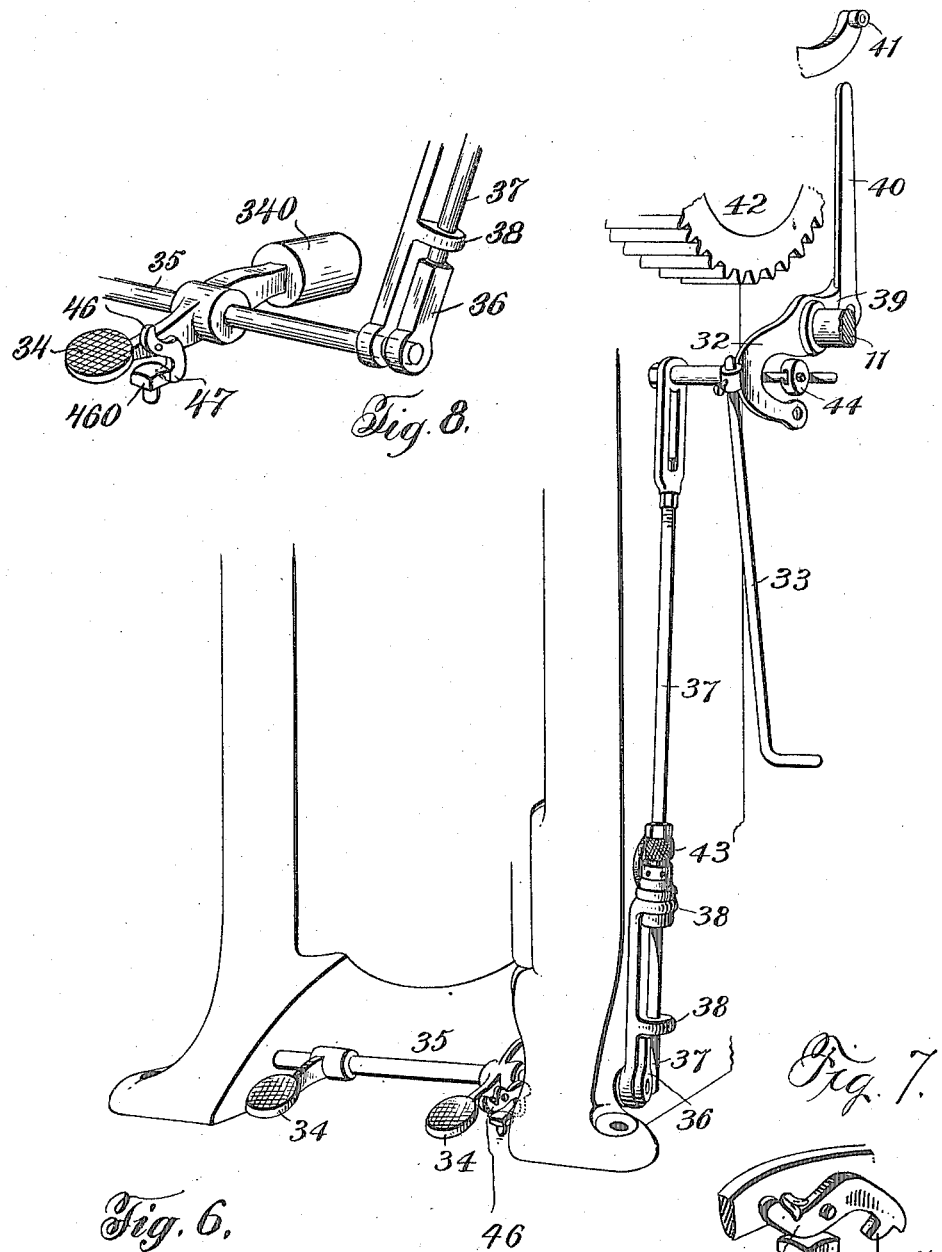

UNITED STATES PATENT OFFICE.

OBERLIN SMITH, OF BRIDGETON, NEW JERSEY.

CLUTCH AND ACTUATING MEANS THEREFOR.

1,198,075.  Specification of Letters Patent.  Patented Sept. 12, 1916.

Application filed December 14, 1911. Serial No. 665,799.

*To all whom it may concern:*

Be it known that I, OBERLIN SMITH, of Bridgeton, in the county of Cumberland, and in the State of New Jersey, have invented a certain new and useful Improvement in Clutches and Actuating Means Therefor, and do hereby declare that the following is a full, clear, and exact description thereof.

Among other objects I have had in view in the production of this invention are the following: first, such a construction of the clutch as will make it so self-contained as to enable it to be manufactured without special reference to any particular position it is to occupy, so that it may be readily applied to a power press, or any other machine requiring a clutch as a part of its organization, and in any position on the machine which may be required in view of the location of the shaft whose revolution is to be controlled by the clutch; and, second, simplification of the structure and increase of its efficiency and the facility of operating the clutch, and with these and other objects hereinafter set forth, in view, my invention consists in the mechanism constructed substantially as hereinafter specified and claimed.

Referring to the drawings—Figure 1 is a front elevation of a clutch embodying my invention; Fig. 2 is an end view of the same; Fig. 3 is a longitudinal section; Fig. 4 is a cross section on line 4—4 of Fig. 1; Fig. 5 is a detail view in perspective, of the operating mechanism. Fig. 6 is a perspective view showing the clutch operating devices. Fig. 7 is a like view of the treadle lock. Fig. 8 is a detail view in perspective of parts of the treadle mechanism.

To illustrate an embodiment of my invention, I have selected an instance of its application in which a constantly running band wheel 10 is to be clutched to a shaft 11 having a pinion 12 by which power is to be transmitted to the desired machinery, the pinion being preferably, but not necessarily formed by gear teeth cut in an enlargement of the shaft. The clutch shaft 11 is journaled in two boxes carried by a bracket, 13, that is provided with bolt holes for its attachment to the press or machine frame; as all parts of the clutch mechanism are carried by this bracket, the structure is thus a self-contained one, or a unit, and, therefore, can be carried in stock for use on various machines without change.

The wheel 10 is journaled on the shaft 11 so as to turn freely thereon, and as illustrated in Fig. 3, it has the internal circumference of its rim coned to be engaged by the coned periphery of wooden friction blocks, 14, secured to a spider 15 which has a hub by which the spider is mounted upon the shaft 11, the spider having, as is usual, an axial movement to carry its blocks or shoes into and out of frictional contact with the rim of the wheel 10. Pivoted to ears 16, on a collar, 17, which is secured to the clutch shaft by screws, 18, are two bell-crank toggle levers, 19, one arm of each of which is connected by links 20 to the clutch spider and another arm of which is connected by links, 21, to the end of a bar, 22, forming a toggle beam that passes diametrically through coinciding slots in the clutch shaft and the spider hub. Besides being the means to rock the toggle levers, as presently explained, the bar or beam 22, connects the spider and shaft so that they cannot independently rotate. The bar or beam 22, is restrained from endwise movement, as well as guided in its movement axially of the clutch shaft, by pins or projections, 23, that bear upon diametrically opposite flat surfaces on the shaft. When the toggle beam or bar, 22, is moved to rock the toggle levers to set the clutch, the beam and the opposite links connected therewith will be brought into alinement, and thus the clutch be locked in its set position, and, of course, the clutching pressure increases as said parts move into alinement.

The bracket, 13, carries a brake member in the form of a brake-spider, 24, having like the fly wheel 10, a conical surface for engagement by wooden blocks or shoes, 25, carried by the clutch spider on the side opposite that having the clutch shoes so that alternately the clutch and brake are applied, to revolve and stop the clutch shaft, respectively. The brake spider is made separately from the bracket, 13, but it is bolted thereto, so as in effect to be a part thereof, and to secure perfect alinement of the brake spider, its surface and the seat on the bracket engaged by it, are cylindrically curved on an axis concentric with the clutch shaft axis.

The clutch shaft is bored axially from its outer end inward to a point slightly beyond the toggle beam or bar, 22, and passing through the channel, thus formed, is a rod 26, which at its inner end is attached to said beam, and is the means by which motion is imparted to said beam to actuate the clutch spider. At its outer end the rod, 26, has a collar, 27, which is engaged by one end of a lever, 28, pivoted to an arm on the brake spider, while at its other end it has a ball and socket connection with one end of a rod, 29, whose other end is connected to one arm of a lever, 30, pivotally and slidably mounted on a vertical stud or post, 31, on the bracket, 13. The other arm of the lever, 30, is connected by a kind of universal joint to a clutch actuating lever 32, which is pivotally hung on the clutch shaft so that when swung in opposite directions, it will move the clutch spider to set the clutch and apply the brake, respectively, and it is because of the swinging of the lever 32, that it is necessary to have its rocking lever 30 mounted to slide slightly upon the vertical stud.

Attached to the clutch actuating lever, is a handle rod or bar 33, by which the clutch actuating lever may be rocked. It may also be caused to swing in the direction to set the clutch by a treadle, and in the direction to unclutch and apply the brake, by automatic means. The treadle comprises two pedals or foot members 34 fixed to a rock shaft 35, which at one end has a crank arm 36 that constitutes a latch adapted, by the rocking of the shaft, to swing into and out of position beneath the lower end of a vertically extending rod 37 which at its upper end is pivotally connected to the clutch actuating lever and at its lower portion passes through a pair of guide lugs, 38, mounted on the frame leg. As shown in Fig. 6, the latch has been swung from beneath the lower end of the treadle rod and the latter has dropped, so that its lower portion lies alongside and in rear of the latch. The treadle is weighted as by a heavy block 340, or spring-actuated so that the latch tends to swing to a position beneath the lower end of the rod 37, as shown in Fig. 8, when the latter is raised and the parts are in unclutching and breaking position, and the clutch, therefore, may be locked in unclutched position automatically. The treadle shaft 35 presses loosely through an opening in the lower end of the member which carries the guide lugs 38. The arm, 40, at the back of the clutch lever, projects upwardly in the path of the roller 41, at the outer end of a roller-arm carried by the gear wheel 42 of the press, so that by the contact of said roller, the clutch lever will be automatically swung to release the clutch, and lift the rod, 37, into position for the automatic engagement of the latch therewith. With this arrangement, the clutch remains set through one revolution of the press. The gear wheel 42 transmits motion to the pinion 12 through a pinion 420 with which the gear 42 meshes and a gear 421 connected with the pinion 420, and which meshes with the pinion 12.

Applied to the rod 37, is a stop collar, 43, preferably of rubber, which when the rod falls upon the disengagement of the latch therewith, strikes an adjustable nut mounted on the upper rod-guiding lug, and, thus, the degree of movement of the clutch spider and the pressure of the friction shoes upon the fly wheel 10, are determined. To supplement the weight of the rod and the other parts to cause the gripping of the clutch, an adjustable and removable weight 44, is applied to the clutch-lever 32, or in place of a weight, an adjustable spring may be used.

The weight 44 may be adjusted forward, or toward the handle 33 so as to cause the lever 32 to normally tend to swing downward at the front where the handle 33 is attached to it, so that when the treadle 34 is rocked to swing the latch 36 from beneath the lower end of the rod 37, the lever 32 will swing downward with the rod 37, and thereby the clutching operation performed. Unclutching will automatically take place at each revolution of the press shaft by the engagement of the roller-arm 41 with the lever 40, which acts to swing the latter in the direction to rock the clutch actuating lever 32 in the reverse direction to that in which it is moved by gravity when the treadle releases the rod 37. For this automatic unclutching it is necessary that the latch 36 be restrained from falling beneath the lower end of rod 37, and it is so restrained by means of the engagement of the pawl 47 of dog 46 with the head of bolt 460, which prevents the rocking of the treadle shaft 35 by the action of the weight 340. Both clutching and unclutching movements may be performed by hand, by use of the handle 33, in which case the treadle is locked by placing the dog 46 in the condition shown in Fig. 7 where it is locked by a cotter pin so that if it be attempted to rock the treadle downward, said dog 46 engaging the top of a stop bolt 460 will prevent such movement, and thus prevent the latch 36 being thrown beneath the rod 37. To prevent automatic unclutching by the action of the roller arm 41 on the lever 40, said roller arm may be attached to the gear wheel 42 so that it may be shifted out of position to strike the lever 40 as the gear revolves. When hand operation by means of the hand lever 33 is to be done, the weight 44 may be shifted so as to cause the balancing of the lever 32 and its attached parts.

It will be seen that the dog 46 may serve both as a stop against depression of the treadle by foot and as a lock against its lifting by the action of the weight 340. When positioned to act as a stop, it prevents the accidental or mischievous starting of the machine. To permit the pawl 47 to act, the cotter pin is removed.

It will be seen that the complete organization, including the clutch and the brake (with the exception of simple treadle connections) is mounted upon the bracket 13, so that all that is necessary for the equipment of a press or other machine with its power-controlling mechanism, is to secure the bracket to the machine framework in the position required for the delivery of power from the shaft 11 to the main shaft of the machine, duly connecting it with a treadle if desired.

Since it cannot be known in advance precisely what will be the position of the clutch on a given machine, so that, for example, in a press in which the movements of the parts for producing clutching and unclutching operation are to be automatically performed, it will be necessary to adapt the length and the angular position of the rod 37, to the particular case in hand, but this, of course, is a simple matter of merely lengthening or shortening the rod, etc.

By my invention the structure is so self-contained that without alteration the clutch will operate when applied to the machine either side up, or will run in either direction, the latter being important because of its adaptability to either single or double-geared presses or other machines.

Having thus described my invention what I claim is—

1. The combination of a bracket, a shaft supported by the bracket, a wheel loose on the shaft, a clutch member connected with the wheel, a clutch member connected with the shaft, a rod slidably mounted in the shaft, connections between said rod and said clutch member, a clutch actuating lever hung on the shaft on which it swings, and connections between said lever and said rod mounted on said bracket.

2. The combination of a bracket, a shaft supported by the bracket, a wheel loose on the shaft, a clutch member connected with the wheel, a clutch member connected with the shaft, a rod slidably mounted in the shaft, connections between said rod and said clutch member, a clutch actuating lever hung on the shaft, and connections between said lever and said rod mounted on said bracket, comprising a pivotally and slidably mounted lever, engaging said clutch lever, a rod connected to said pivotally and slidably mounted lever, and a lever connected with both rods.

3. The combination of clutch mechanism and operating means therefor comprising automatic and hand operated means and a longitudinally movable rod, a latch movable into and out of position to engage said rod, and acting to prevent movement of the rod when in engagement therewith, a treadle, a connection between the latch and the treadle and settable means to prevent movement of the latch to rod-engaging position.

In testimony that I claim the foregoing I have hereunto set my hand.

OBERLIN SMITH.

Witnesses:
 NORA F. DUFFIELD,
 HUGH L. REEVES.

Copies of this patent may be obtained for five cents each, by addressing the "Commissioner of Patents, Washington, D. C."